United States Patent
Jiang et al.

(10) Patent No.: US 10,108,835 B2
(45) Date of Patent: Oct. 23, 2018

(54) METHOD AND SYSTEM FOR DECODING TWO-DIMENSIONAL CODE USING WEIGHTED AVERAGE GRAY-SCALE ALGORITHM

(71) Applicant: FUJIAN LANDI COMMERCIAL EQUIPMENT CO., LTD., Fuzhou, Fujian (CN)

(72) Inventors: Shengzhang Jiang, Fujian (CN); Weidong Wu, Fujian (CN)

(73) Assignee: FUJIAN LANDI COMMERCIAL EQUIPMENT CO., LTD., Fuzhou (CN)

( * ) Notice: Subject to any disclaimer, the term of this patent is extended or adjusted under 35 U.S.C. 154(b) by 0 days.

(21) Appl. No.: 15/871,161

(22) Filed: Jan. 15, 2018

(65) Prior Publication Data

US 2018/0137321 A1    May 17, 2018

Related U.S. Application Data

(63) Continuation of application No. PCT/CN2016/090990, filed on Jul. 22, 2016.

(30) Foreign Application Priority Data

Jul. 23, 2015   (CN) .......................... 2015 1 0437265

(51) Int. Cl.
G06K 19/00   (2006.01)
G06K 7/14    (2006.01)
G06K 7/10    (2006.01)

(52) U.S. Cl.
CPC ............. G06K 7/1417 (2013.01); G06K 7/10 (2013.01)

(58) Field of Classification Search
USPC ................................ 235/435, 439, 454, 462
See application file for complete search history.

(56) References Cited

U.S. PATENT DOCUMENTS

2005/0121520 A1* 6/2005 Yamaguchi .............. G06K 7/14
                                                235/462.09

FOREIGN PATENT DOCUMENTS

| CN | 1670763 A | 9/2005 |
| CN | 101826159 A | 9/2010 |
| CN | 104517089 A | 4/2015 |

* cited by examiner

Primary Examiner — Matthew Mikels

(57) ABSTRACT

The invention provides a method and system for decoding two-dimensional code using weighted average gray-scale algorithm. The method comprises: segmenting a received two-dimensional code image into bit regions each containing one bit data; presetting a shifting threshold, and shifting four original boundary lines of the bit region outwards by a distance of the shifting threshold to obtain four preset boundary lines; calculating an average gray-scale value of the bit region using the weighted average algorithm by taking an overlapping area between pixels inside the four preset boundary lines and the bit region as a weight; binarizing the two-dimensional code image according to the average gray-scale value of the bit region; and decoding the two-dimensional code image. The influence of the pixels which have an overlapping area with the bit region on the average gray-scale value of the bit region is considered, and the decoding accuracy and success rate are high.

7 Claims, 1 Drawing Sheet

Figure 1:
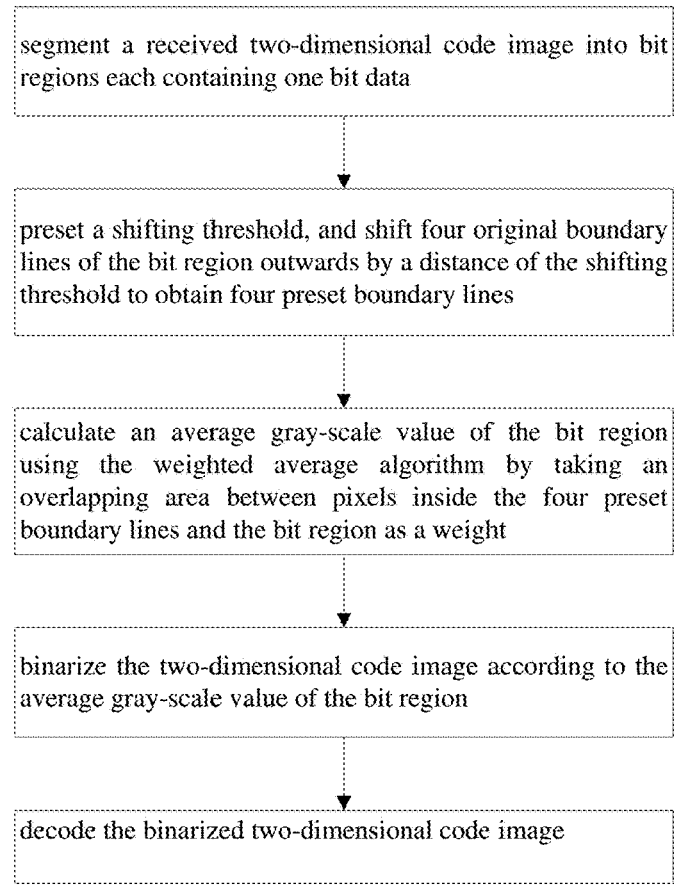

METHOD AND SYSTEM FOR DECODING TWO-DIMENSIONAL CODE USING WEIGHTED AVERAGE GRAY-SCALE ALGORITHM

CROSS REFERENCE TO RELATED APPLICATIONS

The present application is a Continuation Application of PCT Application No. PCT/CN2016/090990 filed on Jul. 22, 2016, which claims the benefit of Chinese Patent Application No. 201510437265.2 filed on Jul. 23, 2015. All the above are hereby incorporated by reference.

FIELD OF THE INVENTION

The invention relates to the field of two-dimensional code technology, and in particular, to a method and system for decoding two-dimensional code using weighted average gray-scale algorithm.

BACKGROUND OF THE INVENTION

The two-dimensional code decoding algorithm based on image processing can be generally divided into six steps: acquiring an image, preprocessing image, positioning and correcting, reading data, error correcting and decoding. The basic step of image preprocessing includes gray-scale transformation, image filtration, threshold segmentation and edge detection, and binarization is included in the threshold segmentation. After enhancement algorithms such as contrast adaption and brightness adjustment are applied to the obtained gray-scale image, the background and the target in the image are segmented using the binarized image algorithm, and the image is converted into an image with only two colors of black and white for subsequent use in decoding.

However, due to factors such as different media on which the two-dimensional code is attached, different lighting environments and different imaging systems, the two-dimensional code images captured by the two-dimensional code reading devices may differ greatly, and the influence of noise, image lighting unevenness and a contrast that is too large or too small will all make the conversion of the two-dimensional code image into a binarized image be very complicated. However, the effect of image binarization process has a direct influence on the two-dimensional code reading effect. The binarization methods in the prior art have some deficiencies in dealing with a complicated background, and cannot well handle problems such as darkness, uneven lighting, too large contrast, or too small contrast, thus failing to obtain a good binarization effect.

Chinese invention patent publication No. CN104517089A discloses a two-dimensional code decoding system and method. The decoding method includes: binarizing a two-dimensional code image to obtain a binarized image, and the binarization processing includes: segmenting the two-dimensional code image to obtain several block regions; acquiring gray-scale values of all the pixels in each of the block regions, and obtaining a gray-scale value of each of the block regions according to the gray-scale values of all the pixels; calculating a gray-scale threshold of each of the block regions according to an average gray-scale value of the predetermined range in which the block region is located; binarizing pixels in the block region to obtain a binarized image, according to the gray-scale threshold corresponding to each of the block regions; and decoding the binarized image to obtain information content contained in the two-dimensional code. In binarizing the code image, by segmenting the code image into blocks, the average gray-scale value of a predetermined range of the block region in which the pixel is located is considered when determining whether the pixel in each block region is black or white during the process of restoring the code image. The two-dimensional code image is segmented into n*n block regions, where n>1. The gray-scale value of a certain block region is determined according to the relationship between the contrast factor and the difference between the maximum gray-scale value and the minimum gray-scale value in the block region in combination with the gray-scale values of other block regions adjacent to the block region. Only the sum of gray-scale values of all the pixels, the maximum gray-scale value, the minimum gray-scale value and the number of pixels in the block region are considered for the contrast factor, without considering the area factor of the block region, and the area of the block region is related to the division of the block regions.

SUMMARY OF THE INVENTION

Technical Problem

The technical problem to be addressed by the invention is to provide a method and system for decoding two-dimensional code using weighted average gray-scale algorithm, which have more accurate average gray-scale values of image division regions.

In order to solve the above technical problem, technical solutions according to the invention are provided as follows.

A method for decoding two-dimensional code using weighted average gray-scale algorithm includes:

segmenting a received two-dimensional code image into bit regions each containing one bit data;

presetting a shifting threshold, and shifting four original boundary lines of the bit region outwards by a distance of the shifting threshold to obtain four preset boundary lines;

calculating an average gray-scale value of the bit region using the weighted average algorithm by taking an overlapping area between pixels inside the four preset boundary lines and the bit region as a weight;

binarizing the two-dimensional code image according to the average gray-scale value of the bit region; and decoding the binarized two-dimensional code image.

The invention has the following advantageous effects: all the pixels associated with the bit region are found by shifting the four original boundary lines of the bit region outwards by a distance of the shifting threshold, the average gray-scale value of the bit region is calculated using the weighted average algorithm by taking an overlapping area between the pixels and the bit region as a weight, thus reducing the error in decoding the two-dimensional code, eliminating the decoding difficulty caused by the distortion of the two-dimensional code image and the insignificant gray-scale contrast or the like due to environmental factors such as photographing light and angle, and avoiding a case where there is no gray-scale value in the bit region due to the fact that no pixel falls completely into the bit region, which presents a high decoding success rate.

A system for decoding two-dimensional code using weighted average gray-scale algorithm includes:

a segmenting module which is configured for segmenting a received two-dimensional code image into bit regions each containing one bit data;

a shifting module which is configured for shifting four original boundary lines of the bit region outwards by a distance of the shifting threshold to obtain four preset boundary lines;

a calculating module which is configured for calculating an average gray-scale value of the bit region using the weighted average algorithm by taking the overlapping area between pixels inside the four preset boundary lines and the bit region as a weight;

a binarizing module which is configured for binarizing the two-dimensional code image according to the average gray-scale value of the bit region; and a decoding module which is configured for decoding the binarized two-dimensional code image.

The invention has the following advantageous effects: the received two-dimensional code image is segmented into bit regions corresponding to the bit data, and then the bit regions are binarized so as to facilitate fast decoding of the two-dimensional code image; the searching range for the pixels influencing the gray-scale value of the bit region is expanded to a region whose distance from the four original boundary lines of the bit region is within the shifting threshold range, thus avoiding unsuccessful decoding due to the fact that there is no pixel in the bit region; the average gray-scale value of the bit region is calculated using the weighted average algorithm by taking the overlapping area between the pixels inside the four preset boundary lines and the bit region as a weight, so the influence of image distortion and environmental factors such as photographing light and angle on the two-dimensional code image can be eliminated, thus presenting high decoding accuracy and success rate.

BRIEF DESCRIPTION OF THE ACCOMPANYING DRAWINGS

Figure 2:
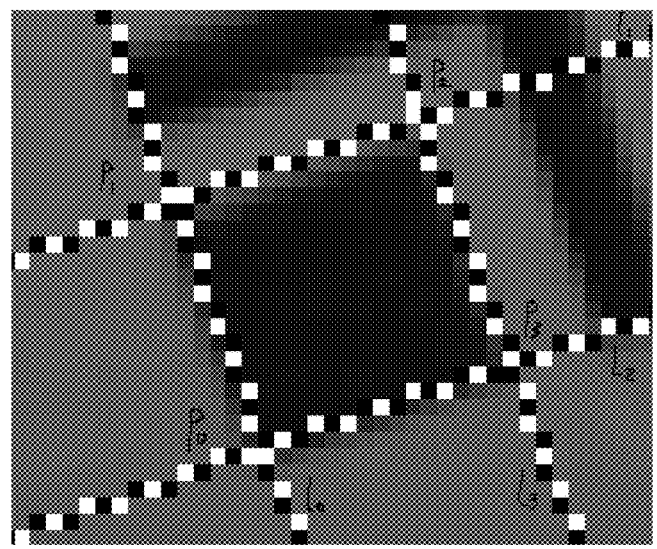

FIG. 1 is a flowchart of a method for decoding two-dimensional code using weighted average gray-scale algorithm according to an embodiment of the invention; and FIG. 2 is a schematic diagram of the weighted average algorithm for bit regions of a two-dimensional code image according to a first embodiment of the invention.

DETAILED DESCRIPTION OF THE PREFERRED EMBODIMENTS

In order to illustrate the technical solutions, the objects and effects of the invention in detail, embodiments are described below in conjunction with the accompanying drawings.

The critical concept of the invention is to calculate the average gray-scale value of the bit region using the weighted average algorithm by taking the overlapping area between the pixels and the bit region as a weight. The influence of gray-scale values of the pixels which have an overlapping area with the bit region on the average gray-scale value of the bit region is fully considered, thus eliminating the influence of environmental factors on the average gray-scale value of the bit region and improving the success rate of decoding the two-dimensional code image.

Technical term involved in the invention is listed in table 1.

TABLE 1

| technical term | interpretation |
| --- | --- |
| weighted average algorithm | typically meaning using a number of observation values of the same one variable arranged in temporal sequence in the past and using the temporal sequence number as a weight to calculate the weighted arithmetic average value of observation values; in the present application, meaning using the overlapping area between the pixels and the bit region as a weight and using the gray-scale values of pixels as observation values to calculate the weighted arithmetic average value of observation values, that is, the average gray-scale value of the bit region. |

Referring to FIG. 1, a specific embodiment of the invention is described as follows.

A method for decoding two-dimensional code using weighted average gray-scale algorithm includes:

segmenting a received two-dimensional code image into bit regions each containing one bit data;

presetting a shifting threshold, and shifting four original boundary lines of the bit region outwards by a distance of the shifting threshold to obtain four preset boundary lines;

calculating an average gray-scale value of the bit region using the weighted average algorithm by taking an overlapping area between pixels inside the four preset boundary lines and the bit region as a weight;

binarizing the two-dimensional code image according to the average gray-scale value of the bit region; and decoding the binarized two-dimensional code image.

Further, the shifting threshold is less than or equal to the width of one pixel.

As can be seen from the above description, if a pixel falls outside the bit region, there will be no influence on the average gray-scale value of the bit region, and therefore, the shifting threshold should be less than or equal to the width of one pixel.

Further, a solution of calculating the overlapping area between pixels inside the four preset boundary lines and the bit region includes:

finding all the pixels inside the four preset boundary lines;

selecting one selected point from the pixels and recording coordinates of the selected point and a position relationship between the selected point and boundary lines of the pixels;

calculating distances from the selected point to the four original boundary lines of the bit region and their position relationships;

calculating a length and a width of the overlapping area between the pixels and the bit region; and calculating the overlapping area between the pixels and the bit region.

As can be seen from the above description, by selecting a selected point from the pixels, distances from the selected point to the four original boundary lines of the bit region and their position relationships are firstly calculated, and then the overlapping area between the pixels and the bit region is calculated. The calculation of the overlapping area between regions is converted into the calculation of a point-to-line distance, thus simplifying the data processing step and improving the operation efficiency and accuracy.

Further, the selected point is any one of the pixels.

As can be seen from the above description, if a corner point among the pixels is selected as the selected point, there is an advantage of simplifying calculation. Of course, the selected point may be any one of the pixels, as long as the position relationships between the selected point and the boundary lines of the pixels can be determined. The boundary lines of the pixels can be also found easily, and the overlapping area between the pixels and the bit region is further calculated.

Further, calculating an average gray-scale value of the bit region using the weighted average algorithm by taking the overlapping area between pixels inside the four preset boundary lines and the bit region as a weight specifically includes:

assuming that k represents the number of pixels inside the four preset boundary lines, $P_i$ represents pixels, where $i=1, 2, \ldots, k$, $S_i$ represents the overlapping area between the pixels $P_i$ and the bit region, S represents the area of the bit region, $Gp_i$ represents the gray-scale value of the pixels $P_i$, and Gave represents the average gray-scale value of the bit region, then the average gray-scale value Gave of the bit region is:

$$Gave = \sum_{i=1}^{k} Gp_i * S_i / S.$$

As can be seen from the above description, by using the gray-scale value of the pixel as an observation value and using the overlapping area between the pixels and the bit region as a weight, the average gray-scale value of the bit region is obtained by dividing the sum of the products of the observation values and the weight by the area of the bit region. The average gray-scale value of the bit region is obtained using the weighted average algorithm, and the influence of the gray-scale value of each pixel on the average gray-scale value of the bit region is fully considered, thus improving the decoding success rate.

Further, calculating an average gray-scale value of the bit region using the weighted average algorithm by taking the overlapping area between pixels inside the four preset boundary lines and the bit region as a weight specifically includes:

assuming that k represents the number of pixels inside the four preset boundary lines, $P_i$ represents pixels, where $i=1, 2, \ldots, k$, $S_i$ represents the overlapping area between the pixels $P_i$ and the bit region, $Gp_i$ represents the gray-scale value of the pixel $P_i$, and Gave represents the average gray-scale value of the bit region, then the average gray-scale value Gave of the bit region is:

$$Gave = \frac{\sum_{i=1}^{k} Gp_i * S_i}{\sum_{i=1}^{k} S_i}.$$

As can be seen from the above description, by using the gray-scale value of the pixel as an observation value and using the overlapping area between the pixels and the bit region as a weight, the average gray-scale value of the bit region is obtained by dividing the sum of the products of the observation values and the weight by the sum of the all the overlapping areas. The average gray-scale value of the bit region is obtained using the weighted average algorithm, and the influence of the gray-scale value of each pixel on the average gray-scale value of the bit region is fully considered, thus improving the decoding success rate.

Further, binarizing the two-dimensional code image according to the average gray-scale value of the bit region specifically includes:

calculating a gray-scale threshold of the two-dimensional code image according to the average gray-scale value of the bit region by using the Otsu method; and binarizing the bit region according to the gray-scale threshold so as to obtain the binarization of the two-dimensional code image.

As can be seen from the above description, by calculating the gray-scale threshold of the two-dimensional code image using the Otsu method, the probability of misclassifying the background color and the foreground color can be reduced, and the correctness of decoding the two-dimensional code image is improved.

Further, binarizing the two-dimensional code image according to the average gray-scale value of the bit region specifically includes:

calculating a gray-scale threshold of the two-dimensional code image according to the average gray-scale value of the bit region by using the average value algorithm; and binarizing the bit region according to the gray-scale threshold so as to obtain the binarization of the two-dimensional code image.

As can be seen from the above description, for a two-dimensional image whose dark color region and light color region have the same area, calculating the gray-scale threshold of the two-dimensional code image using the average value algorithm has the advantage of fast and convenient calculation.

Referring to FIG. 1 and FIG. 2, a first embodiment of the invention is described as follows.

A method for decoding two-dimensional code using weighted average gray-scale algorithm includes:

segmenting a received two-dimensional code image into bit regions each containing one bit data;

presetting a shifting threshold, and shifting four original boundary lines of the bit region outwards by a distance of the shifting threshold to obtain four preset boundary lines, the shifting threshold being less than or equal to the width of one pixel;

Referring to FIG. 2, calculating an average gray-scale value of the bit region using the weighted average algorithm by taking the overlapping area between pixels inside the four preset boundary lines and the bit region as a weight specifically includes:

finding all the pixels inside the four preset boundary lines, and assuming that four pixels are found;

selecting a pixel at the upper left corner among the pixels as the selected point, i.e., $P_0$, $P_1$, $P_2$ and $P_3$ respectively, and recording coordinates of the selected point and its position relationship with boundary lines of the pixels, assuming that both the length and width of each of the pixels are 1;

calculating distances from the selected point to the four original boundary lines of the bit region and their position relationships, specifically including:

assuming that the four original boundary lines lie in straight lines $l_0$, $l_1$, $l_2$, $l_3$, and calculating distances from $P_0$ to the four original boundary lines $l_0$, $l_1$, $l_2$, $l_3$:

calculating a distance x1 from $P_0$ to $l_0$, where if $P_0$ is on the left of $l_0$, the result is negative; and if $P_0$ is on the right of $l_0$, the result is positive;

translating the straight line $l_2$ which intersects with the straight line $l_0$ and is nearer to $P_0$ so that the translated straight line $l_2$ passes through $P_0$, setting the intersection point of the translated straight line $l_2$ and the straight line $l_0$ to be a point Q, then calculating a distance between two points $P_0$ and Q, namely the distance from $P_0$ to $l_0$;

assuming that the linear equation of straight line $l_0$ is y=kx+b, bringing coordinates of a point into r=y−k*x−b to obtain the value of r; if r>0, then $P_0$ is on the right of $l_0$, x1=d; if r=0, then $P_0$ is on $l_0$, x1=0; and if r<0, $P_0$ is on the left of $l_0$, x1=−d;

calculating a distance x2 from a straight line passing through $P_0$ and parallel to the straight line $l_0$ to the straight line $l_3$ using a similar method;

calculating a distance y1 from a straight line passing through $P_0$ and perpendicular to the straight line $l_0$ to the straight line $l_2$ using a similar method;

calculating a distance y2 from a straight line passing through $P_0$ and parallel to the straight line $l_2$ to the straight line $l_4$ using a similar method;

calculating a length fx and a width fy of the overlapping area between the pixels and the bit region, specifically including:
fx=0, if x1<=−1;
fx=1+x1, if −1<x1<0 and x2<=−1;
fx=x1−x2, if −1<x1<0 and x2>−1;
fx=1, if x1>=0 and x2<=−1;
fx=x2, if x1>=0 and −1<x2<0;
fx=0, if x1>=0 and x2>=0;
fy=0, if y1<=−1;
fy=1+y1, if −1<y1<0 and y2<=−1;
fy=y1−y2, if −1<y1<0 and y2>−1;
fy=1, if y1>=0 and y2<=−1;
fy=y2, if y1>=0 and −1<y2<0;
fy=0, if y1>=0 and y2>=0;

calculating the overlapping area $S_0$=fx*fy between the pixels and the bit region;

calculating S1, S2 and S3 using the above-described method;

where S represents the area of the bit region, S=S0+S1+S2+S3, $Gp_i$ represents the gray-scale value of the pixel $P_i$, and Gave represents the average gray-scale value of the bit region, then the average gray-scale value Gave of the bit region is:

$$Gave = \sum_{i=1}^{k} Gp_i * S_i / S;$$

calculating the average gray-scale value of the bit region using the above-described method;

binarizing the two-dimensional code image according to the average gray-scale value of the bit region, specifically including:

calculating a gray-scale threshold of the two-dimensional code image according to the average gray-scale value of the bit region using the Otsu method; and binarizing the bit region according to the gray-scale threshold so as to obtain the binarization of the two-dimensional code image; and decoding the binarized two-dimensional code image.

A system for decoding two-dimensional code using weighted average gray-scale algorithm includes:

a segmenting module which is configured for segmenting a received two-dimensional code image into bit regions each containing only one bit data;

a shifting module which is configured for shifting four original boundary lines of the bit region outwards by a distance of the shifting threshold to obtain four preset boundary lines;

a calculating module which is configured for calculating an average gray-scale value of the bit region using the weighted average algorithm by taking the overlapping area between pixels inside the four preset boundary lines and the bit region as a weight;

a binarizing module which is configured for binarizing the two-dimensional code image according to the average gray-scale value of the bit region; and a decoding module which is configured for decoding the binarized two-dimensional code image.

A second embodiment of the invention is described as follows.

A system for decoding two-dimensional code using weighted average gray-scale algorithm includes:

a segmenting module which is configured for segmenting a received two-dimensional code image into bit regions each containing only one bit data;

a shifting module which is configured for shifting four original boundary lines of the bit region outwards by a distance of the shifting threshold to obtain four preset boundary lines;

a calculating module which is configured for calculating an average gray-scale value of the bit region using the weighted average algorithm by taking the overlapping area between pixels inside the four preset boundary lines and the bit region as a weight;

a binarizing module which is configured for binarizing the two-dimensional code image according to the average gray-scale value of the bit region; and a decoding module which is configured for decoding the binarized two-dimensional code image.

In summary, with the method and system for decoding two-dimensional code using weighted average gray-scale algorithm according to the invention, all the pixels having an overlapping area with the bit region are found by shifting four original boundary lines of the bit region outwards by a distance of the shifting threshold, the average gray-scale value of the bit region is calculated using the weighted average algorithm by taking the overlapping area between the pixels and the bit region as a weight and taking the gray-scale values of pixels as observation values, and the gray-scale threshold for the binarization of the two-dimensional code image is calculated using the Otsu method or the average value algorithm, thus reducing the error in decoding the two-dimensional code. The method can eliminate the decoding difficulty caused by the distortion of the two-dimensional code image and the insignificant gray-scale contrast or the like due to environmental factors such as photographing light and angle, and avoid a case where there is no gray-scale value in the bit region due to the fact that no pixel falls completely into the bit region. The system has high decoding correctness and success rate.

What is claimed is:

1. A method for decoding two-dimensional code using weighted average gray-scale algorithm, characterized by comprising:

segmenting a received two-dimensional code image into bit regions each containing one bit data;

presetting a shifting threshold, and shifting four original boundary lines of the bit region outwards by a distance of the shifting threshold to obtain four preset boundary lines;

calculating an average gray-scale value of the bit region using the weighted average algorithm by taking an overlapping area between pixels inside the four preset boundary lines and the bit region as a weight;

binarizing the two-dimensional code image according to the average gray-scale value of the bit region; and decoding the binarized two-dimensional code image;

wherein a solution of calculating the overlapping area between pixels inside the four preset boundary lines and the bit region includes:

finding all the pixels inside the four preset boundary lines;

selecting one selected point from the pixel and recording coordinates of the selected point and a position relationships between the selected point boundary lines of the pixels;

calculating distances from the selected point to the four original boundary lines of the bit region and their position relationships;

calculating a length and a width of the overlapping area between the pixels and the bit region; and calculating the overlapping area between the pixels and the bit region.

2. The method for decoding two-dimensional code using weighted average gray-scale algorithm according to claim 1, wherein the shifting threshold is less than or equal to the width of one pixel.

3. The method for decoding two-dimensional code using weighted average gray-scale algorithm according to claim 1, wherein the selected point is any one of the pixels.

4. The method for decoding two-dimensional code using weighted average gray-scale algorithm according to claim 1, wherein calculating an average gray-scale value of the bit region using the weighted average algorithm by taking the overlapping area between pixels inside the four preset boundary lines and the bit region as a weight specifically includes:

assuming that k represents the number of pixels inside the four preset boundary lines, $P_i$ represents pixels, where i=1, 2, . . . , k, $S_i$ represents the overlapping area between the pixels $P_i$ and the bit region, S represents the area of the bit region, $Gp_i$ represents the gray-scale value of the pixels $P_i$, and Gave represents the average gray-scale value of the bit region, then the average gray-scale value Gave of the bit region is:

$$Gave = \sum_{i=1}^{k} Gp_i * S_i / S.$$

5. The method for decoding two-dimensional code using weighted average gray-scale algorithm according to claim 1, wherein calculating an average gray-scale value of the bit region using the weighted average algorithm by taking the overlapping area between pixels inside the four present boundary lines and the bit region as a weight specifically includes:

assuming that k represents the number of pixels inside the four preset boundary lines, $P_i$ represents pixels, where i=1, 2, . . . , k, $S_i$ represents the overlapping area between the pixels $P_i$ and the bit region, $Gp_i$ represents the gray-scale value of the pixel $P_i$, and Gave represents the average gray-scale value of the bit region, the average gray-scale value Gave of the bit region is:

$$Gave = \frac{\sum_{i=1}^{k} Gp_i * S_i}{\sum_{i=1}^{k} S_i}.$$

6. The method for decoding two-dimensional code using weighted average gray-scale algorithm according to claim 1, wherein binarizing the two-dimensional code image according to the average gray-scale value of the bit region specifically includes:

calculating a gray-scale threshold of the two-dimensional code image according to the average gray-scale value of the bit region by using the Otsu method; and binarizing the bit region according to the gray-scale threshold so as to obtain the binarization of the two-dimensional code image.

7. The method for decoding two-dimensional code using weighted average gray-scale algorithm according to claim 1, wherein binarizing the two-dimensional code image according to the average gray-scale value of the bit region specifically includes:

calculating a gray-scale threshold of the two-dimensional code image according to the average gray-scale value of the bit region by using the average value algorithm; and binarizing the bit region according to the gray-scale threshold so as to obtain the binarization of the two-dimensional code image.

\* \* \* \* \*